United States Patent

Colbert, Jr.

[11] 4,123,092
[45] Oct. 31, 1978

[54] CONTRACTION RESISTANT COUPLING FOR PIPE LINES CARRYING GASES OR FLUIDS

[76] Inventor: Thomas E. Colbert, Jr., 150 Wood Valley La., Athens, Ga. 30601

[21] Appl. No.: 721,582

[22] Filed: Sep. 8, 1976

[51] Int. Cl.² ............................................. F16L 55/00
[52] U.S. Cl. .................................. 285/187; 285/302; 285/375; 285/DIG. 6
[58] Field of Search ............. 285/187, 302, 93, 279, 285/375, DIG. 5, DIG. 6, DIG. 1

[56] References Cited

U.S. PATENT DOCUMENTS

| 1,201,116 | 10/1916 | Vaughn | 285/375 X |
| 1,535,209 | 4/1925 | Dubbs | 285/302 X |
| 3,053,554 | 9/1962 | Magos et al. | 285/93 X |
| 3,296,361 | 1/1967 | Markland et al. | 285/302 X |

FOREIGN PATENT DOCUMENTS 1,356,692  2/1964  France ................................. 285/187

*Primary Examiner*—Werner H. Schroeder
*Assistant Examiner*—Moshe I. Cohen

[57] ABSTRACT

A sealing joint in the form of a coupling utilized to connect two gas conveying lines and in which the lines on either side of the joint have different co-efficients of expansion and in which the coupling permits lateral movement between said two lines while retaining a sealed joint for said gas lines.

4 Claims, 2 Drawing Figures

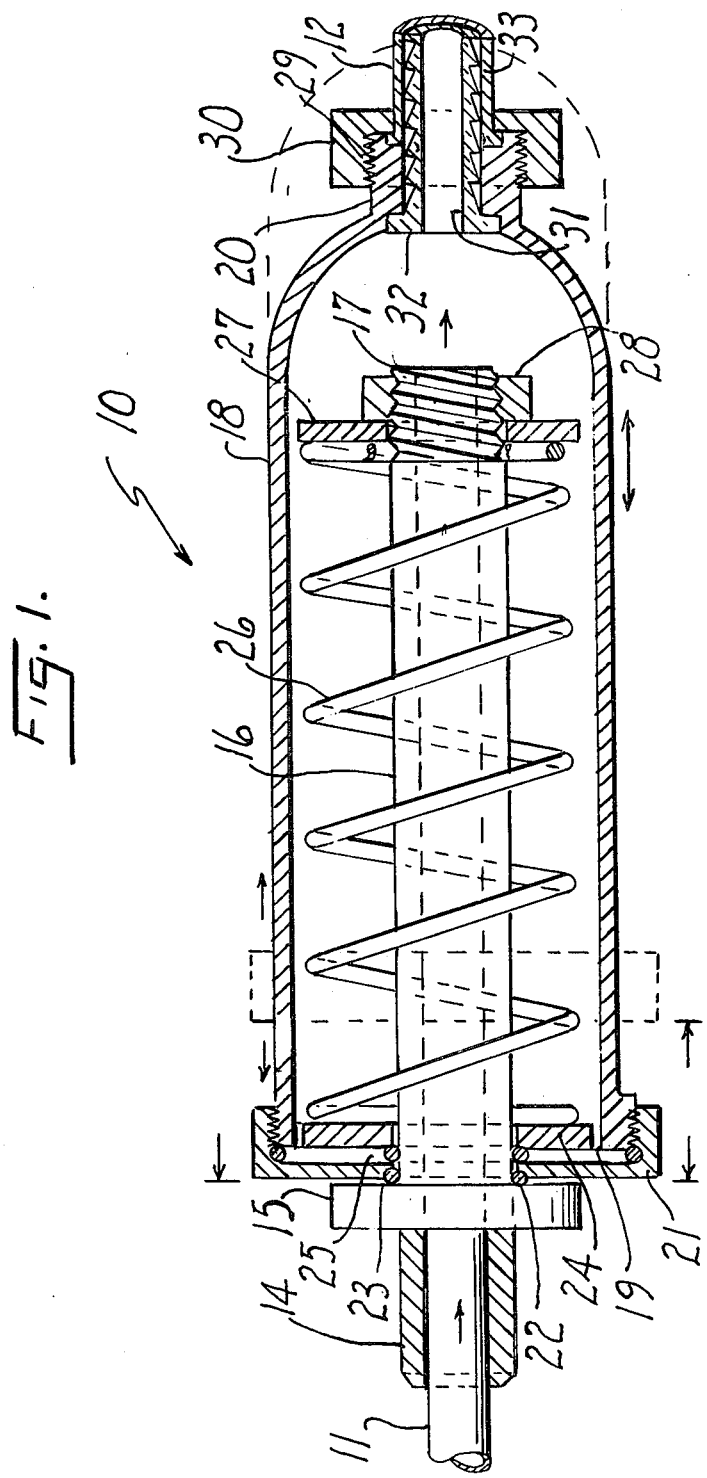

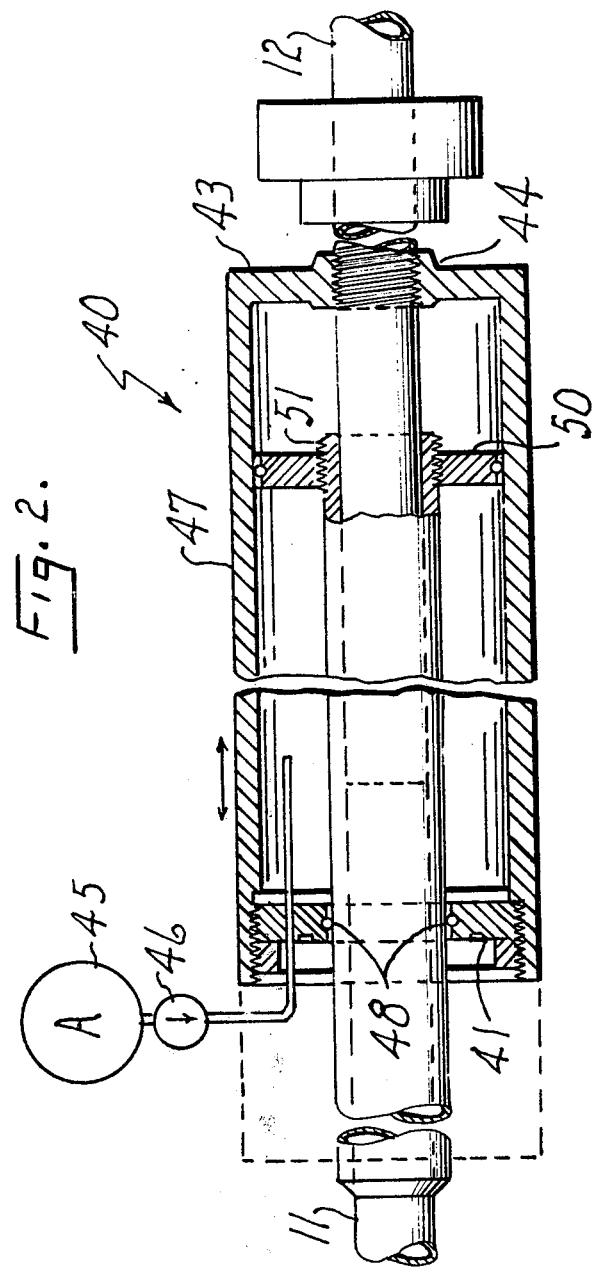

CONTRACTION RESISTANT COUPLING FOR PIPE LINES CARRYING GASES OR FLUIDS

This invention relates to a sealing joint or coupling utilized to connect two gas lines in which the thermal co-efficient of expansion of the two gas lines differs.

This invention relates to a resilient sealed coupling used to join two pressurized gas lines whose compositions have a different co-efficient for expansion and permit a degree of expansive and contractive movement between said lines without rupture or leakage.

More specifically, it is an object of this invention to provide a resilient coupling used to join a metal pipe with an expandible heat sensitive plastic pipe and because of the difference in their co-efficient of expansion and contraction providing a resilient sealed over-riding of one pipe with relation to the other to maintain a pressurizing gas tight relationship.

A further object of this invention is to provide a thermo-sensitive couple for a gas line in which two different expandible materials constitute the elements of the couple and gas pressure is maintained during the expansion and contraction of the thermo-sensitive elements.

Another object of this invention is to provide a coupling between an inlet tube and an outlet tube in which the tubes have a different co-efficient of expansion and contraction in response to changes in temperatures without being rendered apart or losing its gas tight pressurized seal and thus inoperative.

A further object of this invention is to provide a safety device for maintaining a sealed coupled relationship of two tubes that are composed of materials having a different co-efficient of expansion during temperature changes and therefore a differing degree of linear movement.

A still further object of this invention is to provide a coupling for contracting and expanding an inlet tube and an outlet tube in which two different expandable materials constitute the elements of the couple and in which gas pressure is to be maintained within the couple during expansion and contraction and in which there is a spring to return the coupling to its shortest configuration and in which there are "0" ring seals in the tube to insure a gas tight seal.

A still further object of this invention is to provide a coupling for contracting and expanding an inlet tube and an outlet tube in which two different expandable materials constitute the elements of the couple and in which gas pressure is to be maintained within the couple during expansion and contraction and in which there is an air pressure cylinder biased to return the coupling to its shortest configuration and in which there are "0" ring seals in the tubes to insure a gas tight seal.

Further objects may be apparent by reference to the following description and the drawings in which FIG. 1 is a cross sectional view of the thermosensitive coupling with a resilient element joining an intake gas line and outlet gas line, and FIG. 2 is a cross sectional view of a thermosensitive coupling with a fluid pressure return cylinder joining an intake gas line and an outlet gas line.

The thermosensitive coupling 10 for a gas line according to this invention in which materials having a different co-efficient of expansion are utilized, with be responsive to temperature changes, that is, when two different materials are utilized to form the coupling. When the co-efficient of expansion of the one supply line 11 is different than the co-efficient of expansion of the other plastic line 12, the lines cannot be connected by a direct fixed joint due to the different expansion and contraction. A coupling to permit a degree of movement of one line with relation to the other and at the same time retain the internal gas pressure is shown in FIG. 1. In FIG. 1 the coupling 10 may be comprised of a metal intake line 11 and a plastic outlet line 12. The lines or pipes are connected by a resilient coupling 10, FIG. 1. The coupling 10 is comprised of a metal such as iron intake or supply line 11. Line 11 is provided with an extended bushing 14 for affixation with a standard line. The line 11 is provided with a stop shoulder 15 and line 11 continues with an extended hollow barrel 16 having a threaded end 17. A housing 18 is provided of a length slightly more than the length of the barrel 16. Housing 18 is cylindrical to surround the barrel 16 and is provided with one enlarged open end 19 that is externally threaded, and a smaller end 20 also externally threaded. The end 19 is threadably secured to a circular disc 21. Disc 21 has a central aperture 22 to fit snugly over barrel 16 and a seal 23 is positioned on barrel 16 so that aperture 22 will be sealed when disc 21 abuts with shoulder 15 of bushing 14. A circular disc 24 is slideably fitted on barrel 16 and also mounted within housing 18 and provided with a seal 25 adjacent the surface of barrel 16 to retain the internal area of barrel 16 under gas pressures. A spring 26 is mounted over barrel 16 and within the confines of housing 18. One end of the spring 26 abuts with the circular disc 24, the opposite end of spring 26 will be pressed inward by a disc 27 and disc 27 will be held in an adjustable pressed position by a nut 28 threaded on the end 17 of barrel 16. The spring 26 is mounted in this position with a slight degree of compression, thus providing sufficient force to seal 25 in abutment with disc 21. The spring 26 also prevents or limits the couplings extension within certain limits. Housing 18 at its opposite smaller end 20 is externally threaded at 29 for a nut 30. End 20 is provided with a port 31 into which a plastic line 32 is inserted. A stiffener plastic hollow plug 33 may also be used, being mounted within line 32. The nut 30 will compress the end of the plastic line against the end of port 31 locking it in a sealed union with housing 18. It is apparent that gas supplied from line 11 will flow through hollow barrel 16 and into housing 18 and from housing 18 into port 31 and through the plastic line 32. Thus the flow of gas is the same as it would be in an ordinary rigid pipe coupling. However since the expansion of a metal pipe is less than the expansion of a plastic pipe because their co-efficients of expansion vary, it is necessary to provide a resilient coupling that will permit this absorbing variance in lineal movement. For a certain designed length of plastic pipe there will be a difference in lineal expansion and contraction under changing temperatures within the designed limits of the coupling. Thus the plastic pipe may be used as designed without fear of rupture due to a change in temperature.

Referring to FIG. 2 there is illustrated a thermosensitive coupling similar to that illustrated in FIG. 1 and used to similarly couple pipe lines 11 and 12. The pipe line 12 is slideably fitted into pipe line 11 to provide a slip joint, however pipe line 11 has a piston 50 affixed to its exterior surface at 51. Pipe line 12 has a movable cylinder 43 affixed at 44 to move with expansion and contraction of pipe line 12 thus forming a compression cylinder 47. Cylinder 43 extends over piston 50 and a closure disk 41 is threadably inserted in the open end of cylinder 43. Disk 41 is provided with a central aperture to permit pipe line 11 to pass through the disk 41. A seal 48 is provided in disk 41 to retain the compression in cylinder 43 during any movement of line 12 and cylinder 43. Thus with pipe line 11 practically in a set position the piston 50 may be considered stationary, while with pipe line 12 movable under temperature changes, the cylinder 43 will move laterally with respect to piston 50. That is, due to the differing co-efficients of expansion pipe line 11 and piston 50 remain practically set or with a very small lateral movement while pipe line 12 and cylinder 43 will move laterally. Cylinder 43 will move to the right compressing further the fluid in cylinder 47 when there is contraction in line 12 and will move to the left when there is expansion in line 12 reducing the fluid pressure in cylinder 47. To insure or assist the coupling a fluid such as air is trapped within cylinder 47 and slightly pressurized. Thus as the cylinder 43 moves to the left under expansion in line 12, there is a slight drop in fluid pressure within cylinder 47, however as the temperature drops there will be a contraction in line 12 and the cylinder 43 will move to the right increasing pressure within cylinder 47. Thus the coupling is thermosensitive and allows expansion and contraction produced by the plastic line 12, while the line 12 moves within line 11 and is sealed to prevent any gas leakage.

The plastic pipe may be one of the particular plastics such as nylon or any other plastic acceptable by the gas companies. The stress of expansion and compression should be in a straight line, therefore the iron pipe and the plastic pipe should be positioned on the same straight axis. This coupling may be increased or decreased in lineal direction depending upon the expansion and contraction expected in the local area used. To insure the maintenance of an operating pressure a compressed air tank 45 may be added and connected through a one way pressure control valve 46 to maintain the fluid pressure in cylinder 47.

Dimensional stability is more difficult to control and predict in a plastic than in a metal because plastics are visco-elastic solids — they have some characteristics of a solid; others are like those of a highly viscous liquid. In short term mechanical tests, most plastics respond as true solids, but in long term tests under load, they behave as extremely viscous liquids. Data on long term dimensional stability of plastics may be difficult to come by.

Although the coupling is designed to allow expansion and contraction between two connecting lines it is also clear that this coupling does not preclude the joining of two lines having the same co-efficient of expansion if a change or repair required it. It is also to be understood that the coupling will permit the joining of similar size lines or of different size lines with additional couplings.

It is also to be understood that another function of the spring in FIG. 1 or the fluid pressure in FIG. 2 is to restore the coupling to its shortest configuration, to thus permit a full degree of movement when required.

Although we have described the device in detail it is understood that various modifications of the apparatus of the invention may be made without departing from the spirit or the scope thereof and this invention is limited only to the structure as designed in the appended claims.

What is claimed is:

1. A temperature responsive coupling for two fluid carrying tubes comprising one tube having a low co-efficient of expansion and a second tube having a high co-efficient of expansion, said second tube having an enlarged hollow female end and said first tube having an extended male end to fit within said female end of said second tube, the open end of said enlarged hollow female end of said second tube provided with a closure disc having a circular aperture to encircle and slideably fit said first tube, seals provided between said disc and said first tube to insure a fluid tight relationship, said first tube provided with an enlarged end against which said disc may abut, said first tube provided with an extended portion having a threaded end, a circular plate to fit said first tube and abut with said closure element, a spring passed over said first tube to abut said circular plate and a disc fitted over the threaded end of said first tube to abut and compress said spring, a nut fitted to said threaded end of said first tube to hold said spring compressed, said second tube movable in expansion and contraction with changes in external temperature, said coupling allowing a full linear expansion of said second tube and an expected degree of contraction during changes of temperature surrounding said coupling and attached lines.

2. A pipe line connector according to claim 1 in which there are tubes having different co-efficients of expansion comprising one temperature-responsive tube adapted to move relative to the other temperature responsive tube in accordance with a change in external temperature, said second tube expanded to fit over said first tube and provided with a sliding radial seal, a coil spring mounted over said first tube and within said second tube, expansion of said mounted spring to resist movement between the tubes but permit a degree of lateral movement under stress.

3. A temperature responsive coupling for two fluid carrying tubes comprising a first tube having a low co-efficient of expansion and a second tube having a high co-efficient of expansion, said second tube having an extended enlarged cylinder end, said first tube having an extended male end to fit within said female end of said second tube and said male end formed as a piston, said second tube provided with a sliding sealed fit to the exterior of said first tube to form a compression cylinder, said cylinder charged with air slightly compressed to produce a pressure on said second tube toward its full expansion, said second tube contracting in a linear dimension with change to cooler temperature and producing a movement of the enlarged cylinder end and further compression of the air within said cylinder and said second tube expanding with change to warmer temperature and producing a movement of the enlarged cylinder end and expansion of the air within said cylinder.

4. A pipe line coupling according to claim 2 for maintaining the flow of fluid under changing temperatures comprising two tubes having different thermal co-efficients of expansion and said tubes expanding and contracting in response to surrounding temperatures, one of said tubes assembled to surround the other of said tubes in the form of a coupling, said cooperating tubes interconnected to give the degree of movement equal to the difference in the expansion of the tubes for changes in the surrounding temperature.

* * * * *